United States Patent Office 3,481,320
Patented Dec. 2, 1969

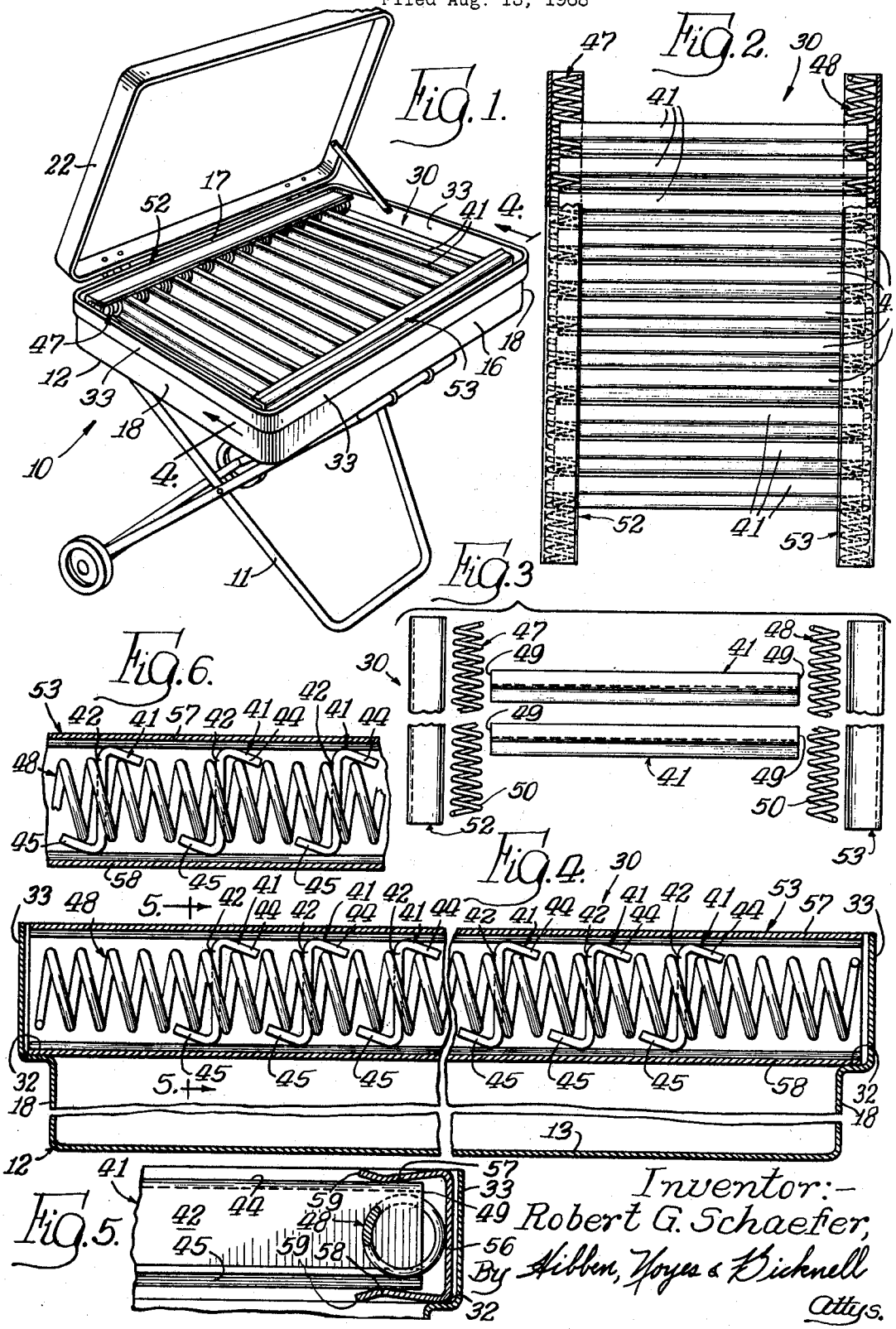

1

3,481,320
BARBECUE GRILL
Robert G. Schaefer, 632 Hill St.,
Highland Park, Ill. 60035
Filed Aug. 13, 1968, Ser. No. 752,358
Int. Cl. A47j 37/07
U.S. Cl. 126—25    11 Claims

ABSTRACT OF THE DISCLOSURE

A barbecue grill wherein a plurality of elongated, grill elements are releasably retained in spaced, parallel relation by mounting means engageable with the end portions of the grill elements. A plurality of longitudinally spaced recesses are provided in the mounting means for receiving and frictionally retaining the end portions of the grill elements. The spacing between the grill elements may be varied by inserting the end portions thereof into different pairs of recesses in the mounting means to control heat transfer through the grill, and the grill is easily assembled and disassembled to facilitate cleaning of the separate parts thereof.

---

This invention relates to barbecue grills, and more particularly relates to a multiple part grill having separate grill elements which can be easily removed for cleaning or replacement and wherein the spacing between the grill elements is adjustable.

Barbecue grills or grids are conventionally constructed in one piece so that the grill elements or bars which support the food during cooking are permanently and rigidly interconnected. Consequently, the grill must be cleaned as a unit and the spacing between the bars is fixed. While such a unitized construction is advantageous from a strength and cost standpoint, cleaning is often difficult and, if one or more of the bars should break or otherwise become defective, the entire grill must be replaced. Moreover, the fixed spacing between the adjacent bars of such a grill often results in a nonuniform application of heat to the item being barbecued with the result that some parts of the item are overcooked and others are undercooked. In addition, barbecue grills of the foregoing construction offer no protection to the item being barbecued from flames resulting from ignited fat drippings and the like.

Accordingly, it is the general object of the present invention to provide a novel and improved barbecue grill which overcomes the aforementioned problems and disadvantages.

Another object of the invention is to provide a novel multiple part barbecue grill which may be easily and rapidly disassembled to facilitate cleaning and/or replacement of the parts.

A further object is to provide a novel barbecue grill wherein the spacing between the grill elements is adjustable.

Still another object is to provide a novel multiple part barbecue grill which does not require fasteners to maintain the parts thereof in assembled relation.

A more particular object is to provide a novel barbecue grill wherein a pair of coiled mounting members are utilized to retain a plurality of separate grill elements in assembled relation.

Still another object is to provide a novel barbecue grill which is simple in construction, economical to manufacture and reliable in operation.

Other objects and advantages of the invention will become apparent from the following detailed description and accompanying drawing, wherein:

FIG. 1 is a perspective view of a portable barbecue unit utilizing a barbecue grill embodying the features of the present invention;

FIG. 2 is a top plan view, with portions thereof broken away, of the barbecue grill utilized in the barbecue unit of FIG. 1;

FIG. 3 is a fragmentary, exploded plan view of a portion of the barbecue grill shown in FIG. 2;

FIG. 4 is a broken, longitudinal sectional view taken substantially along the line 4—4 of FIG. 1;

FIG. 5 is a sectional view taken substantially along the line 5—5 of FIG. 4; and FIG. 6 is a fragmentary, longitudinal sectional view, similar to FIG. 4, but showing certain parts of the grill spaced a somewhat greater distance apart than in FIG. 4.

Briefly described, the present invention contemplates a novel barbecue grill wherein a plurality of elongated grill elements or bars are releasably retained in parallel, spaced relation by mounting means comprising at least one and preferably a pair of elongated mounting members. The mounting members, to be hereinafter described in detail, are in the form of coils having a series of recesses therein defined by the spaces between adjacent turns of the coils. Such recesses serve to receive and frictionally retain the end portions of the grill bars when the latter are forcefully inserted into the recesses. A large number of recesses are provided in each mounting member so that a wide latitude or adjustment is possible in the spacing between adjacent pairs of grill bars. Variation in the spacing between the grill bars serves to control the amount of heat transferred to an item of food being barbecued. In addition, the recesses in the mounting members maintain the grill elements in a slightly inclined position from the perpendicular, with respect to the source of heat, which is beneficial.

The barbecue grill of the present invention also includes support means comprising at least one and preferably a pair of elongated support members in the form of channels for rigidifying the assembly. The channels are sized to enclose the mounting members and frictionally engage portions of the grill bars when the channels are engaged with the mounting members. Thus, the various parts of the grill are maintained in assembled relation by friction and without the use of fasteners so that the grill may be rapidly and easily disassembled for purposes of adjustment, parts replacement, shipment or storage.

In FIG. 1, a portable barbecue grill unit, indicated generally at 10, is illustrated. The unit 10, in the present instance, comprises a foldable frame 11 which serves as a base for the unit. A rectangularly-shaped fire box 12 having a bottom wall 13 (FIG. 4) and upstanding front, rear and side walls 16, 17 and 18, respectively, is supported on the upper ends of the frame. A cover 22 is hinged to the rear wall 17 of the fire box 12, and serves to close the open top thereof during certain types of cooking and when the unit is not in use.

Mounted in the upper portion of the fire box 12 is a barbecue grill, indicated generally at 30, embodying the features of the present invention. The grill 30, in the present instance, is supported on a shoulder 32 (FIG. 4) provided by offset portions 33 of the front, rear and side walls 16, 17 and 18, respectively, of the fire box 12.

Referring now to FIGS. 2, 3 and 4, in connection with FIG. 1, the construction of the barbecue grill 30 of the present invention, will now be described. The grill 30 includes a plurality of elongated, separate grill elements or bars 41 which, in the present instance, are preferably Z-shaped in cross section and formed from cold rolled steel. Each bar 41 thus includes a planar web portion 42 and oppositely extending flange portions 44 and 45.

For holding the grill bars 41 in parallel, spaced assembled relation, mounting means comprising at least one and preferably a pair of elongated mounting members 47 and 48 are provided. The mounting members 47 and 48 are in the form of a pair of oppositely wound coils. Each coil is preferably formed from cold rolled steel and is untempered so as to be only slightly axially resilient. The pitch of each coil is such that the adjacent turns thereof are spaced from each other by an amount at least equal to the thickness of the material of the grill bars 41 at the end portions thereof, indicated at 49. The spaces between the adjacent turns of each coil thus define a plurality of longitudinally spaced recesses 50 in the mounting members. Since each recess 50 is defined by the space between an adjacent pair of turns of the coil, and since a portion of one turn of each adjacent pair has an opposite angle of inclination with respect to the parallel portions thereof, each recess 50 is in effect, inwardly tapered. Such taper results in a wedging action on the end portion 49 of the bar, when the end portion is forcefully inserted into the recess, and thus serves to frictionally retain the end portion 49 in the recess.

In addition, the inner surfaces of the flanges 44 and 45 of the bars 41 frictionally engage other portions of the turns of the coils when the end portion 49 is fully engaged in a recess 50. Such engagement provides an additional frictional retaining force between the end portion of the bar and the coil.

By way of example, I have found that if the grill bars 41 are formed from material of 22 gauge thickness and have an overall height of about 1¼ inches, good results are obtained if the coils or mounting members 47 and 48 are formed from wire of circular cross section having a diameter of about .135 inch, the outside diameter of the turns of each coil is about 1.156 inches, and the pitch of the coils is about .4375 inch.

With the foregoing construction, it will be apparent that when a particular spacing between the grill bar elements 41 has been selected in accordance with the degree of heat desired to be conveyed to an item of food to be barbecued, the bars are easily retained in such spaced relation by forcefully inserting the ends 49 thereof into appropriately spaced opposite pairs of recesses 50 in the coils. As shown in FIG. 4, the end portions 49 of the grill elements 41 are shown inserted in recesses separated by three intermediate turns of the coils. In FIG. 6, the bars 41 are shown inserted in recesses separated by four intermediate turns of the coils.

As a general rule, the bars 41 should be spaced closer together, as shown in FIG. 4, when large pieces of food are to be barbecued or when a less intense, uniform heat is desired. Conversely, the bars 41 should be spaced farther apart, as shown in FIG. 6, when smaller or thinner food items are to be barbecued or when a more intense heat is desired for faster cooking.

The bars may also be spaced sufficiently close to each other so that the outer longitudinal end edges of the flange portions of adjacent bars overlap each other, i.e. with the outer longitudinal end edge of the flange portion 44 of one bar overlapping the outer longitudinal end edge of the flange portion 45 of an adjacent bar. Such spacing is desirable from the standpoint that liquified fat is prevented from falling directly through the grill onto the underlying coals.

When the end portions 49 of the grill bars 41 have been inserted into appropriately spaced pairs of recesses 50 in the mounting members 47 and 48, it is desirable to rigidify the assembly before the bars 41 and support members 47 and 48 are mounted over a source of heat, such as a bed of coals in the fire box 12 of the unit 10. To this end, support means comprising at least one and preferably a pair of elongated support members 52 and 53, are provided. Each support member is preferably in the form of a channel having a length substantially equal to the length of the coils or mounting members 47 and 48. Thus, each support member 47 and 48 includes a web portion 56 and integral, spaced flange portions 57 and 58 (FIG. 5). The channels are preferably formed from about 20 to 22 gauge cold rolled steel so that the flange portions 57 and 58 are slightly resilient. The flange portions 57 and 58 preferably taper toward each other by a slight angle so that the space between the inner surfaces of the flange portions 57 and 58 at their closest point is somewhat less than the overall height or width of the grill bars 41.

With such an arrangement, a slight spreading of the flange portions 57 and 58 of each support member 52 and 53 will occur when the latter are shifted over the coils or support members 47 and 48 and into engagement with the end portions 49 of the grill bars 41, as illustrated in FIGS. 4 and 5. In order to facilitate shifting of the channels over the coils and end portions 49 of the bars, the outer, longitudinal end portions, indicated at 59, of the flange portions 57 and 58 are flared away from each other. Such flare serves to spread the flange portions 57 and 58 as they are shifted over the coils and into engagement with the upper and lower surface portions of the grill bars 41. The flange portions 57 and 58 of the channeled support members 52 and 53 are preferably of sufficient depth to fully overlap the coils of the mounting members 47 and 48 when the channels are fully telescoped over the end portions 49.

The support members 52 and 53 thus not only prevent the central portion of the grill 30 from sagging under the weight of a large item of food, such as might occur if the grill 30 were only supported at the longitudinal ends thereof, but also prevent liquified fat or food particles from falling into the coils of the mounting members 52 and 53.

It will be understood that the cross sectional shape and size of the turns of the coils, as well as the pitch thereof, could be varied, and that the cross sectional configuration of the grill bars 41 could be other than that of a Z. In addition, it will be understood that while a grill bar of Z-shaped cross section is preferred, other cross sections could be used. Moreover, since only the end portions 49 of the grill bars extend into the recesses 50 of the coiled mounting members 47 and 48, the intermediate portions of the bars could be of a different cross sectional configuration than the end portions.

While only one embodiment has been heretofore illustrated and described, it will be understood that modifications and variations thereof may be effected without departing from the scope of the invention as set forth in the appended claims.

I claim:

1. A barbecue grill comprising a plurality of elongated grill elements having opposite sets of end portions, and mounting means engaging all of the end portions of at least one of said sets and holding said grill elements in spaced, parallel relation, said mounting means having a plurality of longitudinally spaced recesses therein of greater number than the number of said grill elements and being disengageable from said end portions to facilitate cleaning of said grill elements and to permit adjustment of the spacing thereof by positioning said end portions in different ones of said recesses.

2. The barbecue grill of claim 1, in which said recesses are inwardly tapered, whereby said end portions become wedged in said recesses when forcefully inserted therein.

3. The barbecue grill of claim 1, in which said mounting means comprises at least one elongated mounting member in the form of a coil having spaces between the adjacent turns thereof providing said recesses.

4. The barbecue grill of claim 3, in which said end portions of said grill elements are frictionally retained in said recesses.

5. The barbecue grill of claim 1, in which said mounting means comprises a pair of said elongated mounting members respectively engaging the opposite sets of said end portions.

6. The barbecue grill of claim 1, in which the end portions of said grill elements include planar portions extending into said recesses.

7. The barbecue grill of claim 6, in which at least the end portions of said grill elements are Z-shaped in cross section having a web portion and oppositely extending flange portions, said web portions extending into said recesses.

8. The barbecue grill of claim 7, in which the flange portions of said grill elements have inner surfaces, and said inner surfaces frictionally engage portions of said mounting means adjacent said recesses to provide additional retention of said elements in said mounting means.

9. The barbecue grill of claim 1, including support means engaging said grill elements and serving to support and rigidify the assembly.

10. The barbecue grill of claim 9, in which said mounting means comprises at least one elongated mounting member engaging all of the end portions of at least one of said sets, and said support means comprises at least one elongated support member extending around said mounting member in shielding relation.

11. The barbecue grill of claim 10, in which said support member comprises a channel having spaced flanges and a connecting web, said flanges extending over said mounting member in shielding relation and frictionally engaging said grill elements.

References Cited

UNITED STATES PATENTS

| | | | |
|---|---|---|---|
| 3,973 | 3/1845 | Hawkins | 99—450 X |
| 158,858 | 1/1875 | Mitchell | 99—450 |
| 1,510,547 | 10/1925 | Ferrari | 99—450 X |
| 2,573,115 | 10/1951 | Sisto | 99—450 |
| 3,101,080 | 8/1963 | Lorbacher. | |
| 3,186,331 | 6/1965 | Dettling | 99—445 |
| 3,404,671 | 10/1968 | Wasserman | 126—25 |

CHARLES J. MYHRE, Primary Examiner

U.S. Cl. X.R.

99—450